United States Patent [19]

Inaba et al.

[11] Patent Number: 4,877,388

[45] Date of Patent: * Oct. 31, 1989

[54] MOLD CLAMPING APPARATUS IN AN INJECTION MOLDING MACHINE

[75] Inventors: Yoshiharu Inaba, Kawasaki; Shigeo Tokunaga, Hino, both of Japan

[73] Assignee: Fanuc Ltd., Minamitsuru, Japan

[*] Notice: The portion of the term of this patent subsequent to May 3, 2005 has been disclaimed.

[21] Appl. No.: 183,736

[22] PCT Filed: Jul. 31, 1987

[86] PCT No.: PCT/JP87/00577

§ 371 Date: Mar. 8, 1988

§ 102(e) Date: Mar. 8, 1988

[87] PCT Pub. No.: WO88/01225

PCT Pub. Date: Feb. 25, 1988

[30] Foreign Application Priority Data

Aug. 11, 1986 [JP] Japan .................................. 61-186967

[51] Int. Cl.$^4$ ............................................. B29C 45/66
[52] U.S. Cl. ...................................... 425/150; 318/66;
318/432; 318/625; 318/811; 425/162; 425/168;
425/451; 425/451.9; 425/589
[58] Field of Search ............... 425/589, 590, 593, 595,
425/450.1, 451.2, 451.6, 451.7, 451.9, 150, 162,
167, 168; 318/66, 111, 112, 432, 625, 811;
74/665 A, 665 B, 825

[56] References Cited

U.S. PATENT DOCUMENTS

| | | |
|---|---|---|
| 1,313,079 | 8/1919 | Emmet ................................ 318/112 |
| 3,063,708 | 11/1962 | Wollenhaupt ....................... 192/150 |
| 4,288,727 | 9/1981 | Whitford .............................. 318/111 |
| 4,445,167 | 4/1984 | Okado ................................... 318/811 |
| 4,525,656 | 6/1985 | Kato ..................................... 318/650 |
| 4,528,483 | 7/1985 | Müller .................................. 318/112 |
| 4,547,719 | 10/1985 | Sakamoto et al. ................... 318/811 |
| 4,614,901 | 9/1986 | Kullman et al. ..................... 318/112 |
| 4,644,232 | 2/1987 | Nojiri et al. ............................ 318/66 |
| 4,708,633 | 11/1987 | Hayashi et al. .................. 425/451.7 |
| 4,741,685 | 5/1988 | Inaba et al. .......................... 425/145 |

FOREIGN PATENT DOCUMENTS

| | | | |
|---|---|---|---|
| 43-1511 | 1/1968 | Japan . | |
| 47-19344 | 6/1972 | Japan . | |
| 51-13495 | 4/1976 | Japan . | |
| 59-25038 | 2/1985 | Japan . | |
| 60-49853 | 3/1985 | Japan . | |
| 60-125619 | 7/1985 | Japan .................................. 425/589 |
| 63-5918 | 1/1988 | Japan .................................. 425/589 |

Primary Examiner—James Housel
Attorney, Agent, or Firm—Staas & Halsey

[57] ABSTRACT

A mold clamping apparatus having a plurality of servomotors for drivingly rotating a ball screw as a spindle. A driven timing gear pulley is mounted on a ball nut threadedly engaged with the ball screw whereby the pulley is rotatable integrally with the nut, and driving timing gear pulleys are fixed to output shafts of the respective motors. A timing belt is wound between the driven and driving pulleys. The servomotors are driven so as to produce the same torque by means of driving circuits which respond to the same torque command generated in accordance with a signal representative of a rotational position of one of the servomotors.

3 Claims, 3 Drawing Sheets

MOLD CLAMPING APPARATUS IN AN INJECTION MOLDING MACHINE

BACKGROUND OF THE INVENTION

1. Field of the Invention

The present invention relates to a mold clamping apparatus for use in an injection molding machine, and more particularly to a spindle driving device in a mold clamping apparatus, which is low in cost and has an improved responsiveness.

2. Description of the Related Art

In injection molding machines, mold clamping apparatus have been known of a type comprising a drive source consisting of an electric motor (hereinafter referred to as a motor), and a power transmission system for converting a turning force generated by the drive source into a driving force for axially driving a spindle, and wherein a movable platen arranged to be movable in unison with the spindle is axially driven by the drive source through the power transmission system so as to perform mold-opening, mold-closing and mold-clamping. In a mold clamping apparatus of this kind, the drive source may consist of a single general-purpose motor capable of generating a required mold clamping force of from 5 to 10 tons in case of a small or medium apparatus. In a large mold clamping apparatus requiring a larger mold clamping force, however, the drive source must be of a specially ordered high-output type. For this reason, a considerable cost increase occurs and further operational responsiveness of the motor deteriorates since the inertia of the rotor becomes large.

SUMMARY OF THE INVENTION

The object of the present invention is to provide a mold clamping apparatus for use in an injection molding machine, which is low in cost and has an improved responsiveness.

In order to achieve the above-mentioned object, the mold clamping apparatus of the present invention comprises a plurlity of general-purpose motors, each coupled through a coupling means to a spindle of the mold clamping apparatus, so as to drive the spindle by means of the plurality of motors.

Since the spindle of the mold clamping apparatus is adapted to be driven by means of a plurality of the motors, the spindle driving device of the mold clamping apparatus is low in cost. Moreover since the rotor of each motor is relatively small in diameter the sum of the rotor inertia of the plural motors is smaller than that of a single special motor having a large rotor. Hence the operational responsiveness of the motor, in particular, the acceleration/deceleration characteristics thereof can be improved.

These, together with other objections and advantages, which will be subsequently apparent, reside in the details of construction and operation as more fully hereinafter described and claimed, reference being made to the accompanying drawings forming a part thereof, wherein like numerals refer to like parts throughout.

DESCRIPTION OF THE REFERRED EMBODIMENT

Figure 2:
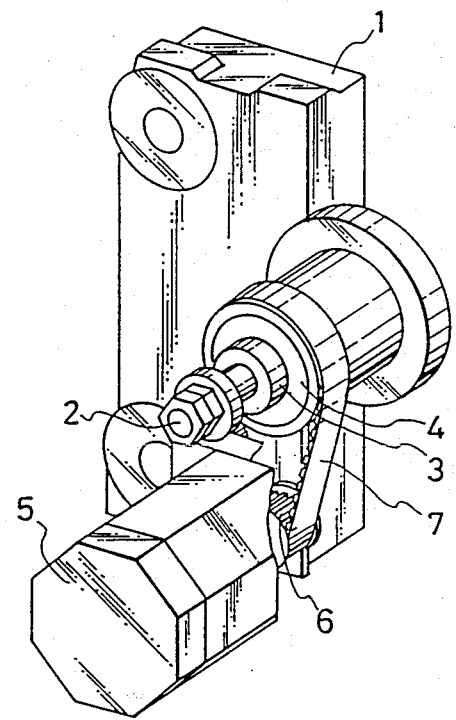
FIG. 2 is a perspective view showing, by way of example, a conventional spindle driving device.

Referring to FIG. 2, a conventional spindle driving device for use in a mold clamping apparatus of an injection molding machine will be explained. In FIG. 2, a ball screw 2 which constitutes a spindle is rotatably supported by a rear platen 1, and a ball nut 3 is threadedly engaged with an outer portion of the ball screw 2 projecting rearwardly of the rear platen 1. A timing pulley (hereinafter referred to as a pulley) 4 is coupled to the ball nut 3 in a manner so as to be rotatable integrally with the ball nut. Further, the pulley 4 is operatively coupled to a servomotor 5 through a timing belt 7 which is wound around the pulley 4 and a second pulley 6 fixed to the output shaft of the motor 5. The ball screw 2 has its inner end coupled to a movable platen (not shown) through a crosshead (not shown) of the mold clamping apparatus (in the case where the apparatus has a toggle mechanism) or coupled directly thereto (in the case of a direct-acting type clamping apparatus).

Where a single motor is employed as the drive source for mold clamping in the aforementioned type of mold clamping apparatus of an injection molding machine, there occur the above-mentioned drawbacks such as increased cost of the spindle driving device, irrespective of whether the single motor consists of a servomotor or not.

Figure 1:
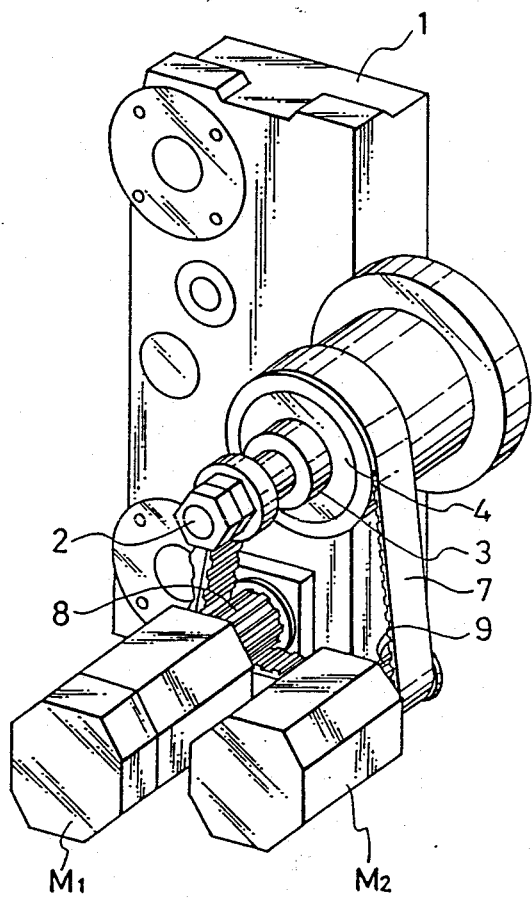
FIG. 1 is a perspectie view showing a spindle driving device of a mold clamping apparatus, according to an embodiment of the present invention.

In the following, a spindle driving device of a mold clamping apparatus for use in an injection molding machine, according to an embodiment of the present invention, will be explained with reference to FIG. 1. Basically, this spindle driving device is constructed in a manner similar to that shown in FIG. 2, parts common in FIGS. 1 and 2 being shown by likee reference numerals or symbols.

Symbols M1 and M2 designate spindle driving motors, each of which comprises an AC servomotor consisting of a general-purpose permanent-magnet synchronous motor. These motors are fixed integrally to the rear platen 1 by an appropriate means, not shown, and each have an output shaft to which drive pulleys 8 and 9 are fixed, respectively. Further, a driven pulley 4 is fixed to a ball nut 3 which is threadedly engaged with a ball screw 2, which constitutes the single spindle of the mold clamping apparatus. The motors, M1, M2 are operatively coupled to the ball nut 3 through the pulleys 4, 8 and 9 and a timing belt 7 is wound around these pulleys.

Furthermore, in order to produce, from the two general-purpose motors M1 and M2, a combined output equivalent to that of a single high-output type motor, the mold clamping device according to this embodiment is arranged to drive these motors so that the motors M1, M2 are driven in synchronism with each other to produce their output torque acting in the same rotational direction. More specifically, a control unit is provided, which has a control circuit responsive to a position/speed signal associated with one of the motors, the motor M1, for instance, and two motor driving circuits for the motors M1 and M2, the control unit being arranged to deliver the same drive current command from its control circuit to both of the motor drive circuits.

Figure 3:
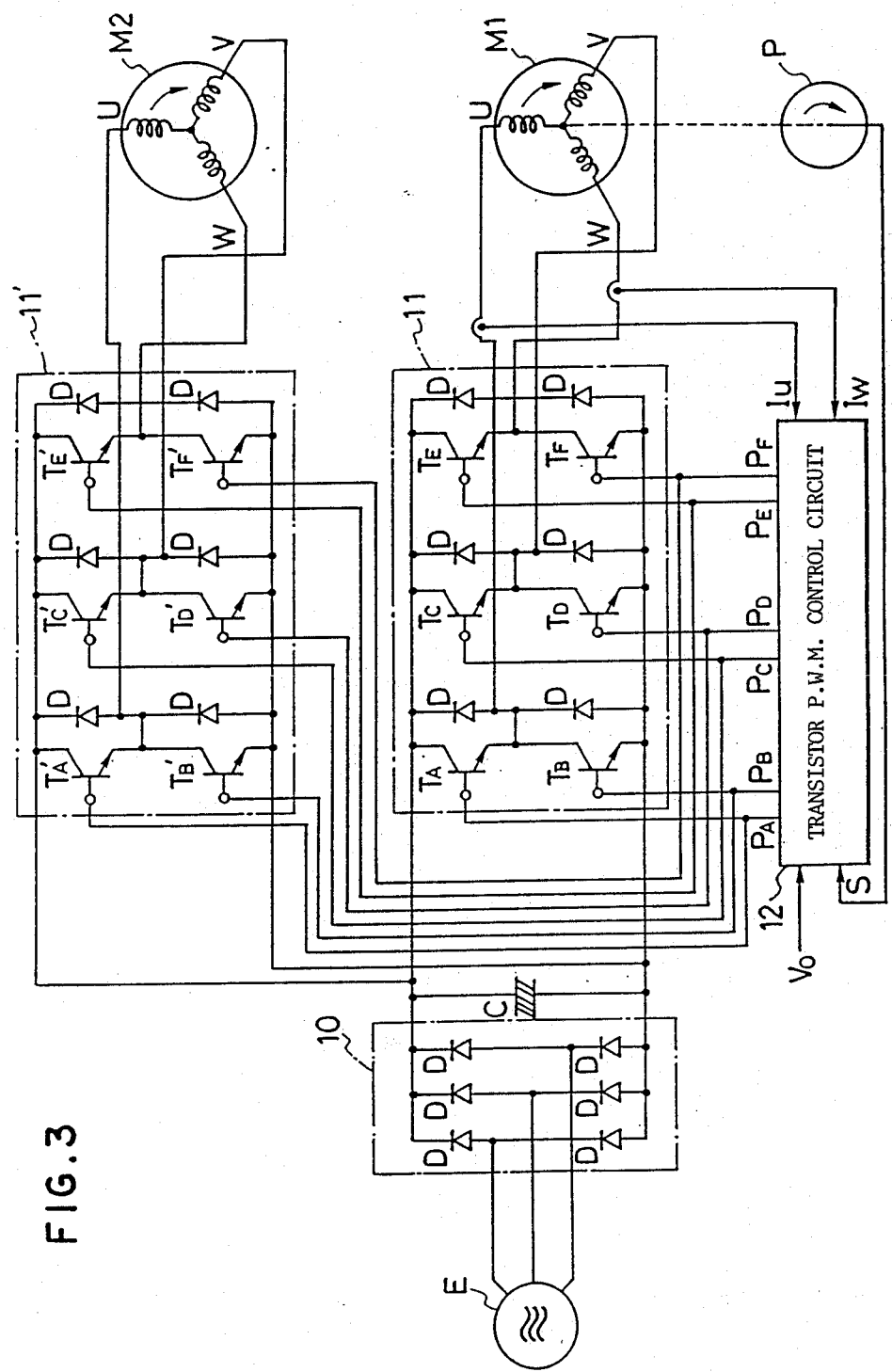
FIG. 3 is a circuit diagram showing a control unit for driving the motor of FIG. 1.

Next, with reference to FIG. 3, a further explanation as to the control unit will be given. Basically, this control unit is constructed in the same manner as a conventional PWM (pulse width modulation) control unit known as a servomotor driving control unit, but differs from a conventional one in that two transistor inverters as power amplifiers are provided, these inverters being connected in parallel with each other. In FIG. 3, reference symbol E designates a three-phase power source, numeral 10 denotes a rectifier, and 11 a transistor inverter, as a power amplifier, which generates an output for driving the servomotor M1. An ordinary PWM control unit only has a transistor inverter 11 for driving a single servomotor. Contrary to this, in the present embodiment, a further transistor inverter 11' is connected in parallel with the transistor inerter 11 and is arranged to drive a corresponding servomotor M2. Reference numeral 12 denotes a transistor PWM control circuit, and symbol P designates the position detector, such as a pulse encoder, for detecting the position and speed of the rotor of the servomotor M1.

The transistor PWM control circuit 12 is arranged to compare a present speed S, detected by the position detector P, with a speed command Vo from a host control unit such as an NC (numericaly controlled machine), to turn on and off transistors TA to TF and TA' to TF' of the transistor inverters 11 and 11', so as to control currents flowing through the U-, V-, and W-phase windings of the servomotores M1 and M2, thereby controlling the rotating speed of the servomotors M1 and M2. Namely, in response to PWM signals PA and PB delivered from the transistor PWM control circuit 12, the transistors TA and TA' and the transistors TB and TB' of the transistor inverters 11 and 11' are simultaneously turned on or off, whereby the currents flowing through the respective U-phase windings of the servomotors M1 and M2 are controlled. Likewise, in response to PWM signals PC and PD, the transistors TC, TC' and the transistors TD, TD' are simultaneously turned on or off, whereby the currents flowing through the respective V-phase windings of the servomotors M1, M2 are controlled. In response to the PWM signals PE and PF, moreover, the transistors TE, TE' and the transistors TF, TF' are simultaneously turned on or off, whereby the currents flowing through the respective W-phase windings of the servomotors M1, M2 are controlled. As a result, the servomotors M1 and M2 are driven in synchronism with each other so as to produce the same torque. A detailed description of the transistor PWM control circuit 12, which is a conventional one, is omitted herein.

In operation, when the speed command value Vo from the host control unit such as an NC, is applied to the transistor PWM control circuit 12, the circuit 12 compares the speed command value Vo with the present speed S detected by the position detector P. In accordance with the difference between the value Vo and the speed S, the control circuit 12 delivers the PWM signals PA to PF, and causes the transistor inverters 11 and 11' to drive the servomotors M1 and M2, so as to control the motor speeds to a command speed. At this time, the transistors associated with the corresponding phases of the transistor inverters 11, 11', serving to control the currents flowing through the windings of the individual phases of the servomotors M1 and M2, are turned on or off in accordance with the same PWM signal, so that one and the same current flows synchronously through the windings of each phase of the servomotors M1 and M2. In consequence, the servomotors M1, M2 rotate in synchronism with each other, with the same output torque, to drive the timing belt 7. In the meantime, since the two timing gear pulleys 8 and 9 are in engagement with the timing belt 7, respectively, no phase dislocation occurs between these timing gear pulleys.

In connecting the motors M1, M2 with the ball screw or spindle 2 a gear train may be employed in place of the timing belt. Further, three or more motors may be employed as distinct from the above-mentioned embodiment having two motors. In this case, it is only required to provide additional transistor inverters which correspond in number to the additional servomotors, and which are connected in parallel with the transistor inverters 11, 11'. Hence neither an additional position detector P such as a pulse encoder nor an additional transistor PWM control unit is required. Although an AC servomotor consisting of a permanent-magnetic synchronous motor is employed in the abovementioned embodiment, a DC servomotor may be used. In this case, one or more additional power amplifiers alone should be provided in the servomotor control unit, while other control circuits and position detectors may be commonly employed.

Numerous alterations and modifications of the structure herein disclosed will suggest themselves to those skilled in the art. It is to be understood, however, that the present disclosure relates to the preferred embodiments of the invention which is for purposes of illustration only and is not to be construed as a limitation of the invention. All such modifications which do not depart from the spirit of the invention are intended to be included within the scope of the appended claims.

We claim:

1. A mold clamping apparatus having a fixed platen, a movable platen and a spindle operatively connected to the moving platen, for use in an injection molding machine which is controlled by a host controller, comprising:
    a plurality of servomotors for driving the spindle;
    coupling means for coupling each of said servomotors to the spindle;
    detecting means for detecting at least one of a rotational position and a rotational speed of one of said servomotors and producing an output signal indicative of said detected position or speed;
    a control circuit for generating a torque command signal in accordance with a difference between said output signal from said detecting means indicative of the detected position or speed and a command signal from the host controller; and
    driving circuits for driving corresponding servomotors, in accordance with said torque command signal supplied from said control cicuit, said driving circuits corresponding in number to that of said plurality of servomotors.

2. A mold clamping apparatus according to claim 1, wherein the spindle comprises a ball screw and an output shaft extends from each motor, and wherein said coupling means includes a ball nut threadedly engaged with said ball screw, a driven timing gear pulley coupled to said ball nut to be rotatable integrally with said ball nut, a driving timing gear pulley fixed to each output shaft, and a timing belt wound between said driven timing gear pulleys and said driving timing gear pulleys.

3. A mold clamping apparatus according to claim 1, wherein each of said servomotors has windings of respective phases and said driving circuits have switching elements which respectively control electric currents flowing through the windings of the respective phases of said servomotors, and wherein said control circuit performs on and off control of said switching elements in accordance with the difference between the output signal and the command signal, so that the same electric current flows through the respective windings which are associated with the same phase.

* * * * *

UNITED STATES PATENT AND TRADEMARK OFFICE
CERTIFICATE OF CORRECTION

PATENT NO. : 4,877,388
DATED : October 31, 1989
INVENTOR(S) : YOSHIHARU INABA et al.

It is certified that error appears in the above-identified patent and that said Letters Patent is hereby corrected as shown below:

On the title page:

[56] References Cited insert

--4,260,936  4/1981  Sun................318/66--.

Column 1, line 42, "plurlity" should be --plurality--;

line 50, after "diameter" insert --,--;

line 64, "perspectie" should be --perspective--.

Column 4, line 55 "cicuit" should be --circuit--.

Signed and Sealed this

Sixth Day of November, 1990

Attest:

HARRY F. MANBECK, JR.

Attesting Officer

Commissioner of Patents and Trademarks